United States Patent
Kinoshita et al.

(10) Patent No.: US 7,696,491 B2
(45) Date of Patent: Apr. 13, 2010

(54) FLUORESCENCE OBSERVATION OR FLUORESCENCE MEASURING SYSTEM, AND FLUORESCENCE OBSERVATION OR FLUORESCENCE MEASURING METHOD

(75) Inventors: Hiroaki Kinoshita, Akishima (JP); Daisuke Nishiwaki, Hino (JP); Kazuhiko Hosono, Hachioji (JP); Masahiro Sakakura, Hino (JP)

(73) Assignee: Olympus Corporation, Tokyo (JP)

( * ) Notice: Subject to any disclaimer, the term of this patent is extended or adjusted under 35 U.S.C. 154(b) by 628 days.

(21) Appl. No.: 11/588,646

(22) Filed: Oct. 27, 2006

(65) Prior Publication Data

US 2007/0297048 A1    Dec. 27, 2007

(30) Foreign Application Priority Data

Jun. 26, 2006    (JP)    ............................ 2006/175494
Jun. 26, 2006    (JP)    ............................ 2006-175495
Jun. 26, 2006    (JP)    ............................ 2006-175496

(51) Int. Cl.
     *G01N 21/64*    (2006.01)
(52) U.S. Cl. ............................................... 250/458.1
(58) Field of Classification Search ............... 250/458.1
See application file for complete search history.

(56) References Cited

U.S. PATENT DOCUMENTS 5,055,497 A * 10/1991 Okada et al. .................. 523/116

2002/0097489 A1 * 7/2002 Kawano et al. .............. 359/388
2005/0157301 A1 * 7/2005 Chediak et al. .............. 356/417

FOREIGN PATENT DOCUMENTS

| JP | 08-178849 | 7/1996 |
| JP | 08-320437 | 12/1996 |
| JP | 2001-083318 | 3/2001 |

* cited by examiner

*Primary Examiner*—Constantine Hannaher
(74) *Attorney, Agent, or Firm*—Kenyon & Kenyon LLP

(57) ABSTRACT

A fluorescence observation or fluorescence measuring system has at least one of a low-fluorescence objective lens including optical elements made of low-fluorescence glass, satisfying Condition (a) described below, a low-fluorescence immersion substance satisfying Condition (b) described below, and a low-fluorescence cover glass satisfying Condition (c) described below:

$$B_{OB}'/B_{OB} \leq 0.7 \quad \text{(a)}$$

$$B_{IM}'/B_{IM} \leq 0.7 \quad \text{(b)}$$

$$B_{CG}'/B_{CG} \leq 0.7 \quad \text{(c)}$$

where $B_{OB}'$, $B_{IM}'$, and $B_{CG}'$ are average intensity values of auto-fluorescence from the low-fluorescence objective lens, immersion substance, and cover glass, respectively, and $B_{OB}$, $B_{IM}$, and $B_{CG}$ are average intensity values of auto-fluorescence from a conventional objective lens, immersion substance, and cover glass, respectively, generally used.

13 Claims, 5 Drawing Sheets

FIG.3A
FIG.3B
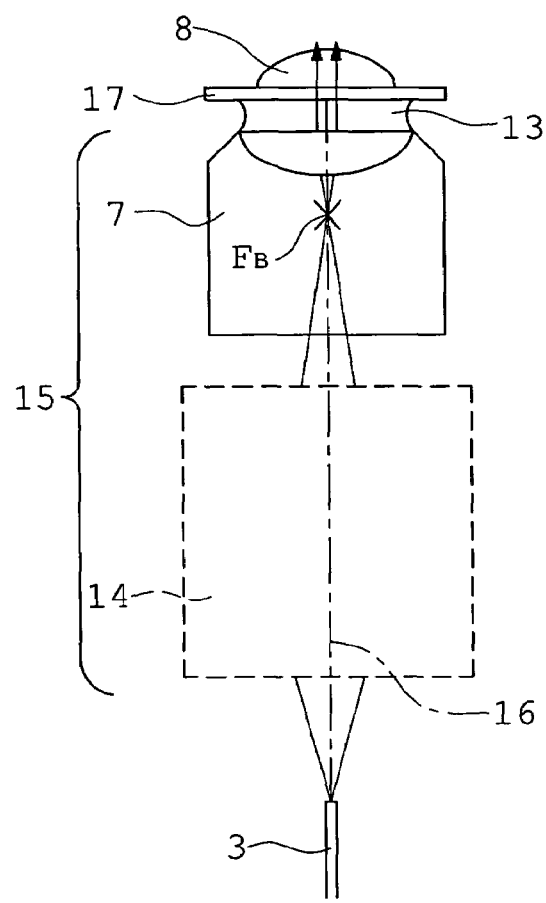
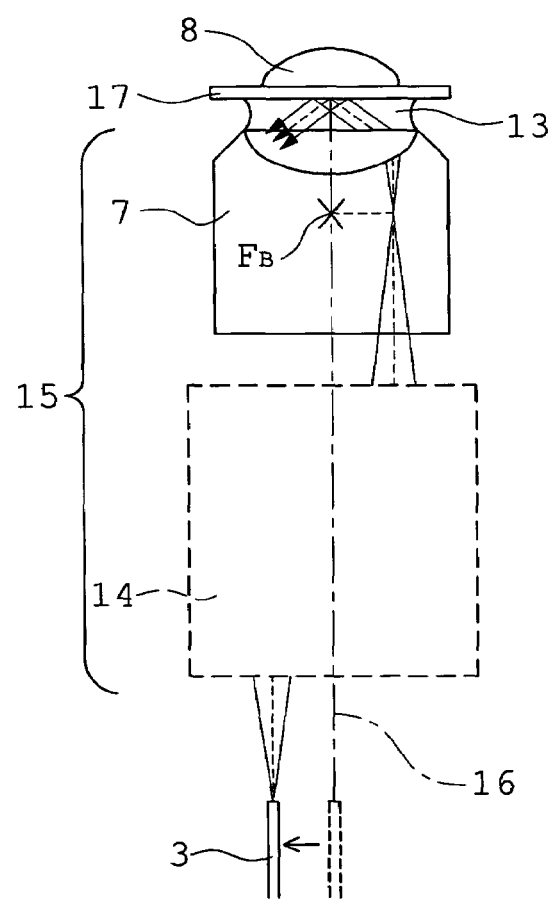

FLUORESCENCE OBSERVATION OR FLUORESCENCE MEASURING SYSTEM, AND FLUORESCENCE OBSERVATION OR FLUORESCENCE MEASURING METHOD

This application claims benefits of Japanese Application No. 2006-175494 filed in Japan on Jun. 26, 2006, No. 2006-175495 filed in Japan on Jun. 26, 2006, and No. 2006-175496 filed in Japan on Jun. 26, 2006, the contents of which are hereby incorporated by reference.

BACKGROUND OF THE INVENTION

1. Field of the Invention

This invention relates to a fluorescence observation or fluorescence measuring system, and a fluorescence observation or fluorescence measuring method.

2. Description of Related Art

By the developments in recent years of measuring instruments and apparatuses in the fields of microscopes, fluorescence microscopes, and protein and DNA analytical apparatuses, tendencies of observations and measurements in these fields are changed. In the changes of the tendencies, there are two great currents described below.

One of them is a change of observation-measurement objects from the observations and measurements of fixed cells to those of living cells. The advent of the post-genome era has increased the importance of the technique that allows accurate observation and measurement of feeble fluorescent light in a broad band with respect to fluorochrome single-molecule fluorescence measurement and a simultaneous analysis of functions of living bodies by the color diversification of fluorochrome. In particular, in the most advanced research field, the need that observations of cells, in vivo, should be continued for a long period of time (in the range from several days to a few weeks) has recently been increased for purposes of the functional clarification of living bodies and the behavior analysis and interaction clarification of proteins, and various techniques of such observations have been developed. In order to observe the cell, the technique of producing a fluorescent protein in a desired cell or introducing the fluorochrome to observe fluorescent light emanating therefrom is often used. The latest technique involves a single-molecule fluorescence observation that is thought of as an ultimate feeble-fluorescence observation and trends to feebler-fluorescence observation and measurement. In a general fluorescence observation, when light for exciting a fluorescent substance (excitation light) is too intense, damage is caused to the cell. Thus, in order to keep the cell alive for a long period of time, it is necessary to set as low an intensity of the excitation light as possible. It is known that when the fluorescent substance is irradiated with the excitation light, the fluorescent light is bleached, not to speak of the cell observation. Even for the purpose of suppressing bleaching by irradiating the substance with faint excitation light, it is very useful to enable an image with a good S/N ratio to be observed with feeble fluorescent light.

When faint excitation light is used, however, the intensity of fluorescent light to be detected is lowered and it becomes difficult to obtain an image with a high S/N ratio. As the fluorescent light becomes feeble, including the case of the single-molecule fluorescence observation that is the ultimate feeble-fluorescence observation, a contribution to the noise increases and the S/N ratio is reduced. Here, the noise refers to auto-fluorescence mainly emanating from an optical system or a specimen.

The other is a change from an apparatus provided with only the function of observation like a conventional microscope apparatus to an apparatus further provided with a means for measuring and quantifying the intensity of fluorescent light, the wavelength, and the localization of matter to be detected. Accurate quantification, including the noise, has been required.

In a fluorescence observation apparatus such as a fluorescence microscope, and a fluorescence measuring apparatus such as a genome/protein analytical apparatus, various wavelengths are observed and measured in a wide range from ultraviolet to infrared. In particular, the fluorescence observation and measurement by three excitations, called U excitation, B excitation, and G excitation, respectively, are typical. The U excitation is caused at a wavelength of about 365 nm and fluorescent light of wavelength about 450 nm is observed and measured; the B excitation is caused at a wavelength of about 488 nm and fluorescent light of wavelength about 540 nm is observed and measured; and the G excitation is caused at a wavelength of about 550 nm and fluorescent light of wave-length about 600 nm is observed and measured.

Conventional fluorescence observation apparatuses and fluorescence measuring apparatuses are proposed, for example, in Japanese Patent Kokai Nos. Hei 08-320437 and Hei 08-178849.

A conventional microscope for fluorescence observation is set forth, for example, in Japanese Patent Kokai No. 2001-83318, as the microscope constructed so that the fluorescence observation by ordinary reflecting illumination and that by totally reflecting illumination are switched to each other.

A fluorescence detecting system through the conventional fluorescence microscope such as the microscope set forth in Kokai No. 2001-83318 is constructed so that a fluorescent substance is irradiated with excitation light to detect fluorescent light emanating from the fluorescent substance through a detector and thereby a specimen is observed.

SUMMARY OF THE INVENTION

The fluorescence observation or fluorescence measuring system according to the present invention comprises at least one of a low-fluorescence objective lens including optical elements made of low-fluorescence glass, a low-fluorescence immersion substance, and a low-fluorescence cover glass.

The fluorescence observation or fluorescence measuring system according to the present invention comprises a low-fluorescence objective lens including optical elements made of low-fluorescence glass. The low-fluorescence objective lens satisfies the following condition:

$$B_{OB}'/B_{OB} \leq 0.7 \tag{1a-1}$$

where $B_{OB}'$ is an average intensity value of auto-fluorescence from the low-fluorescence objective lens and $B_{OB}$ is an average intensity value of auto-fluorescence from a conventional objective lens generally used.

The fluorescence observation or fluorescence measuring system according to the present invention comprises a low-fluorescence immersion substance. The low-fluorescence immersion substance satisfies the following condition:

$$B_{IM}'/B_{IM} \leq 0.7 \tag{1b-1}$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system according to the present invention comprises a low-fluorescence immersion substance. The low-fluorescence immersion substance satisfies the following condition and a refractive index nd of the low-fluorescence immersion substance at the d line (587.56 nm) ranges from above 1.50 to below 1.70:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system according to the present invention comprises a low-fluorescence immersion substance. The low-fluorescence immersion substance satisfies the following condition and a refractive index nd of the low-fluorescence immersion substance at the d line (587.56 nm) is above 1.70:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system according to the present invention comprises a low-fluorescence immersion substance. The low-fluorescence immersion substance includes diiodomethane in which sulfur is dissolved and satisfies the following condition, and a refractive index nd of the low-fluorescence immersion substance at the d line (587.56 nm) is above 1.70:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system according to the present invention comprises a low-fluorescence immersion substance. The low-fluorescence immersion substance satisfies the following condition and a refractive index nd of the low-fluorescence immersion substance at the d line (587.56 nm) is above 1.78:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system according to the present invention comprises a low-fluorescence immersion substance. The low-fluorescence immersion substance includes diiodomethane in which sulfur is dissolved and satisfies the following condition, and a refractive index nd of the low-fluorescence immersion substance at the d line (587.56 nm) is above 1.78:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system according to the present invention comprises a low-fluorescence cover glass. The low-fluorescence cover glass satisfies the following condition:

$$B_{CG}'/B_{CG} \leq 0.7 \quad (1c\text{-}1)$$

where $B_{CG}'$ is an average intensity value of auto-fluorescence from the low-fluorescence cover glass and $B_{CG}$ is an average intensity value of auto-fluorescence from a conventional cover glass generally used.

The fluorescence observation or fluorescence measuring method of the present invention comprises the steps of:

A. selecting a specimen emitting fluorescent light that uses a living cell,

B. selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and C. making the fluorescence observation or fluorescence measurement of the specimen selected in Step A by using the application and the system selected in Step B:

$$B_{OB}'/B_{OB} \leq 0.7 \quad (1a\text{-}1)$$

$$B_{IM}'/B_{IM} \leq 0.7 \quad (1b\text{-}1)$$

$$B_{CG}'/B_{CG} \leq 0.7 \quad (1C\text{-}1)$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, and $B_{CG}$ is an average intensity value of auto-fluorescence from a conventional cover glass generally used.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below:

A. a step of selecting a specimen emitting fluorescent light that uses a living cell, B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and C. a step of observing and measuring fluorescent light of the specimen selected in Step A by using the application and the system selected in Step B:

$$B_{OB}'/B_{OB} \leq 0.7 \quad (1a\text{-}1)$$

$$B_{IM}'/B_{IM} \leq 0.7 \quad (1b\text{-}1)$$

$$B_{CG}'/B_{CG} \leq 0.7 \quad (1c\text{-}1)$$

$$(S-s)/(B+b) \leq 5 \quad (2\text{-}1)$$

$$(B_{OB}+B_{IM}+B_{CG})/B \geq 0.2 \quad (3\text{-}1)$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below and an application selected in Step B is FRET (fluorescence resonance energy transfer):

A. a step of selecting a specimen emitting fluorescent light that uses a living cell, B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and C. a step of observing and measuring fluorescent light of the specimen selected in Step A by using the application and the system selected in Step B:

$$B_{OB}'/B_{OB} \leq 0.7 \quad (1a\text{-}1)$$

$$B_{IM}'/B_{IM} \leq 0.7 \quad (1b\text{-}1)$$

$$B_{CG}'/B_{CG} \leq 0.7 \quad (1c\text{-}1)$$

$$(S-s)/(B+b) \leq 5 \quad (2\text{-}1)$$

$$(B_{OB}+B_{IM}+B_{CG})/B \geq 0.2 \quad (3\text{-}1)$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below; an application selected in Step B is FRET (fluorescence resonance energy transfer); and a system selected in Step B is a fluorescence microscope system:

A. a step of selecting a specimen emitting fluorescent light that uses a living cell, B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and C. a step of observing and measuring fluorescent light of the specimen selected in Step A by using the application and the system selected in Step B:

$$B_{OB}'/B_{OB} \leq 0.7 \quad (1a\text{-}1)$$

$$B_{IM}'/B_{IM} \leq 0.7 \quad (1b\text{-}1)$$

$$B_{CG}'/B_{CG} \leq 0.7 \quad (1c\text{-}1)$$

$$(S-s)/(B+b) \leq 5 \quad (2\text{-}1)$$

$$(B_{OB}+B_{IM}+B_{CG})/B \geq 0.2 \quad (3\text{-}1)$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below; an application selected in Step B is FRET (fluorescence resonance energy transfer); and a system selected in Step B is a totally reflecting microscope system:

A. a step of selecting a specimen emitting fluorescent light that uses a living cell, B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and C. a step of observing and measuring fluorescent light of the specimen selected in Step A by using the application and the system selected in Step B:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below; an application selected in Step B is FRET (fluorescence resonance energy transfer); and a system selected in Step B is constructed as a microscope system in which two fluorescence microscopes or two totally reflecting microscopes, or one fluorescence microscope and one totally reflecting microscope are arranged so that an objective optical system is located opposite to the specimen interposed between two microscopes:

A. a step of selecting a specimen emitting fluorescent light that uses a living cell, B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and C. a step of observing and measuring fluorescent light of the specimen selected in Step A by using the application and the system selected in Step B:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below and an application selected in Step B is calcium imaging:

A. a step of selecting a specimen emitting fluorescent light that uses a living cell, B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and C. a step of observing and measuring fluorescent light of the specimen selected in Step A by using the application and the system selected in Step B:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below; an application selected in Step B is calcium imaging; and a system selected in Step B is a fluorescence microscope system:

- A. a step of selecting a specimen emitting fluorescent light that uses a living cell,
- B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and
- C. a step of observing and measuring fluorescent light of the specimen selected in Step A by using the application and the system selected in Step B:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below; an application selected in Step B is calcium imaging; and a system selected in Step B is a totally reflecting microscope system:

- A. a step of selecting a specimen emitting fluorescent light that uses a living cell,
- B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and
- C. a step of observing and measuring fluorescent light of the specimen selected in Step A by using the application and the system selected in Step B:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below; an application selected in Step B is calcium imaging; and a system selected in Step B is constructed as a microscope system in which two fluorescence microscopes or two totally reflecting microscopes, or one fluorescence microscope and one totally reflecting microscope are arranged so that an objective optical system is located opposite to the specimen interposed between two microscopes:

- A. a step of selecting a specimen emitting fluorescent light that uses a living cell,
- B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and
- C. a step of observing and measuring fluorescent light of the specimen selected in Step A by using the application and the system selected in Step B:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below and an application selected in Step B is a moving-picture observation or time-lapse observation:

A. a step of selecting a specimen emitting fluorescent light that uses a living cell, B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and C. a step of observing and measuring fluorescent light of the specimen selected in Step A by using the application and the system selected in Step B:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below; an application selected in Step B is a moving-picture observation or time-lapse observation; and a system selected in Step B is a fluorescence microscope system:

A. a step of selecting a specimen emitting fluorescent light that uses a living cell, B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and C. a step of observing and measuring fluorescent light of the specimen selected in Step A by using the application and the system selected in Step B:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below; an application selected in Step B is a moving-picture observation or time-lapse observation; and a system selected in Step B is a totally reflecting microscope system:

A. a step of selecting a specimen emitting fluorescent light that uses a living cell, B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition 1b-1) described below, and a low-fluorescence cover glass satisfying Condition (1c-1) described below, and C. a step of observing and measuring fluorescent light of the specimen selected in Step A by using the application and the system selected in Step B:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

The fluorescence observation or fluorescence measuring method according to the present invention comprises Steps A, B, and C described below. A specimen emitting fluorescent light that uses a living cell, selected in Step A, satisfies at least one of Conditions (2-1) and (3-1) described below; an application selected in Step B is a moving-picture observation or time-lapse observation; and a system selected in Step B is constructed as a microscope system in which two fluorescence microscopes or two totally reflecting microscopes, or one fluorescence microscope and one totally reflecting microscope are arranged so that an objective optical system is located opposite to the specimen interposed between two microscopes:

A. a step of selecting a specimen emitting fluorescent light that uses a living cell,
B. a step of selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and
C. a step of observing and measuring fluorescent light of the specimen selected in Step A by using the application and the system selected in Step B:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of background noise in the absence of the specimen, and b is a fluctuation range of the intensity of the back ground noise.

According to the present invention, the fluorescence observation system, the fluorescence measuring system, the fluorescence observation method, and the fluorescence measuring method in which the influence of a noise by auto-fluorescence can be effectively lessened, high-precision and high-quality fluorescence observation and measurement are possible, and the observation and measurement of feeble fluorescent light are also possible are obtained.

Specifically, according to the present invention, the observation system, the measuring system, the observation method, and the measuring method, each of which uses the objective lens, capable of acquiring an image with a high S/N ratio in the feeble-fluorescence observation are obtained.

Further, specifically, according to the present invention, the observation system, the measuring system, the observation method, and the measuring method, each of which uses the immersion substance, as an optical instrument system having high aperture efficiency, which is capable of acquiring an image with a high S/N ratio in the feeble-fluorescence observation and facilitating an optical adjustment for totally reflecting illumination using the objective lens.

Still further, specifically, according to the present invention, the fluorescence observation system, the fluorescence measuring system, the fluorescence observation method, and the fluorescence measuring method, each of which uses the cover glass, capable of making the high-precision and high-quality fluorescence observation and measurement and the feeble-fluorescence observation and measurement are obtained.

These and other features and advantages of the present invention will become apparent from the following detailed description of the preferred embodiments when taken in conjunction with the accompanying drawings.

BRIEF DESCRIPTION OF THE DRAWINGS

FIGS. 3A and 3B are explanatory views of essential parts of an illumination optical system in the fluorescence microscope apparatus of FIG. 1, showing an arrangement of optical members in ordinary reflecting illumination and an arrangement of optical members in totally reflecting illumination, respectively.

DETAILED DESCRIPTION OF THE PREFERRED EMBODIMENTS

Figure 1:
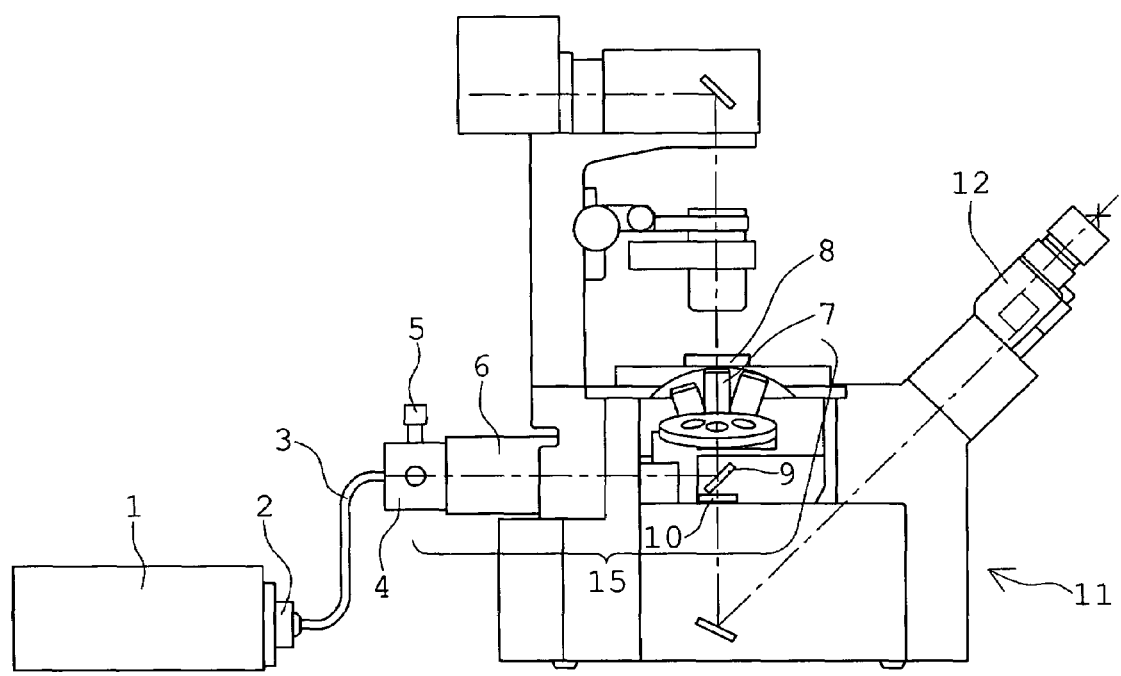
FIG. 1 is a side view showing schematically an example of a conventional inverted reflecting fluorescence microscope apparatus using a laser light source, to which the fluorescence observation or fluorescence measuring system of each embodiment of the present invention is applicable.

Before undertaking the description of the embodiments, the process through which the present invention has been considered will be explained.

Ranking of Brightness of Specimen

The present inventors have found that noise levels required for the fluorescence observation apparatus and the fluorescence measuring apparatus in which the applications of high-precision and high-quality fluorescence observation and fluorescence measurement and the feeble-fluorescence observation and measurement are possible can be ranked as described later in accordance with the specimen used for the observation and measurement.

Here, a formula used for ranking is defined. When an average intensity value of fluorescent light of an object to be observed (or an object to be measured) is represented by S, an average intensity value of auto-fluorescence of the background (a portion where the object to be observed or the object to be measured is absent in the observation region) is represented by B, and the fluctuations of these intensities are represented by s and b, respectively, the S/N ratio of the application is defined as the following formula:

$$(S-s)/(B+b) \tag{2-0}$$

(1) Single Molecule

As a specimen most susceptible to the influence of auto-fluorescence, consideration has been given to the S/N ratio of a so-called single-molecule fluorescence observation, such as that shown in Japanese Patent Kokai No. 2001-272606, applied to the observation of feeble fluorescent light. In the single-molecule fluorescence observation, auto-fluorescence from an observation optical system or measuring optical system is liable to most influence the observation and measurement, and a low-fluorescence design of auto-fluorescence from the objective lens, immersion substance, and cover glass that have been conventionally used is required. In such a feeble-fluorescence single molecule observation, the S/N ratio satisfies the following condition:

$$(S-s)/(B+b) \leq 2 \tag{2-3}$$

(2) Dark Specimen

Subsequently, consideration has been given to the fluorescence observation (or measurement) using the living cell that is most utilized at present. In the observation of the living cell, the activity of the cell must be maintained for a long period of time. Thus, in order to lessen damage to the cell, it is common practice to reduce the amount of fluorescent substance or to lower the intensity of excitation light for irradiation to the living cell. Therefore, the intensity of fluorescent light is also lowered and the S/N ratio satisfies the following condition:

$$(S-s)/(B+b) \leq 3 \tag{2-2}$$

(3) Specimen with Common Brightness

Next, consideration has been given to the case where the intensity of fluorescent light is high in the fluorescence observation (or measurement) using the fixed cell that has been generally used so far, or using the living cell. In the fixed cell, since there is no need to maintain the activity of the cell, the concentration of the fluorescent substance can be increased and the intensity of the excitation light can also be heightened. In this way, the intensity of fluorescent light can be relatively increased. Even when the living cell is used, there is the case where the maintenance of the activity requires a short period of time or where fluorescent protein is produced in a part that has little influence on the cell. In such a case, the S/N ratio satisfies the following condition:

$$(S-s)/(B+b) \leq 5 \tag{2-1}$$

Kind of Application

As mentioned above, the present inventors have found that specimens used for fluorescence observations (or measurements) can be roughly divided into three classes in accordance with the S/N ratio of the application.

In addition, the present inventors have considered the kind of application for making the fluorescence observations (or measurements) of the specimens.

(1) Aspect Observation, FRET

As a technique of observing or measuring specimens such as those mentioned above, FRET (fluorescence resonance energy transfer) is often utilized.

In the FRET, two fluorescent substances, a donor and an acceptor, are used so that the fluorescent wavelength of the donor overlaps the excitation wavelength of the acceptor. Thus, the wavelength of excitation light in the FRET is located on the short-wavelength side of the fluorescent wavelength of the acceptor, compared with the wavelength of excitation light where the fluorescent substance of the acceptor is used by itself. On the other hand, auto-fluorescence from the observation or measuring optical system tends to strengthen as the wavelength of excitation light becomes short. In the FRET, therefore, even when the same fluorescent wavelength is observed or measured, the excitation wavelength is shorter than in the case where the fluorescent substance of the acceptor is used by itself, and thus there is the problem that the production of auto-fluorescence from the observation or measuring optical system becomes pronounced.

(2) Calcium Imagine

There is a calcium ion as a substance that plays a major role in the transmission of an intracellular or intercellular signal. It is supremely important for functional clarification of the cell to observe and measure the gradient and change of the concentration of the calcium ion. There are Fura-2 and Indo-1 as reagents often used when the concentration of the calcium ion is detected. For these reagents, light in the UV region of 300-400 nm is utilized as excitation light. Consequently, the problem arises that the production of auto-fluorescence from the observation or measuring optical system becomes pronounced. Although the reagent called Cameleon that does not use UV light has recently been developed, Cameleon is the reagent applying the FRET mentioned above and hence the same problem as in the FRET is encountered.

(3) Moving-picture, Time Lapse

In the observation of a single molecule on a cell film or in the FRET and calcium imaging, it is important to study a time change of the intensity ratio as well as only the intensity ratio. When the speed of the change is high, a moving-picture observation by a video rate or a higher-speed camera is carried out. In the moving-picture observation, since the phenomenon of a quick change is detected, the exposure time of the camera per frame is necessarily reduced and the intensity of fluorescent light obtained is lowered. In the moving-picture observation, therefore, fluorescent light is feebler than in a common fluorescence observation or measurement, and thus there is the problem that it is difficult to obtain data with good S/N ratios.

When the speed of the change is low, a time-lapse observation in which observations are continued in the range from several hours to a few days is carried out. In the time-lapse observation, since the activity of the cell must be maintained for a long period of time, it is needed to use the lowest possible intensity of excitation light with which the cell is irradiated. In the time-lapse observation, therefore, fluorescent light is feebler than in a common fluorescence observation or measurement, and thus there is the problem that it is difficult to obtain data with good S/N ratios.

As mentioned above, the present inventors have found that even in the application that the specimen is observed, there is a factor that degrades the S/N ratio depending on the application. Actually, by a combination of the specimen applying to the condition of brightness of at least one of Conditions (2-1)-(2-3) with the application of each of Items (1)-(3), the fluorescence observation or measurement is carried out, and the S/N ratio is also governed by combinations of Conditions (2-1)-(2-3) with Applications (1)-(3).

Study of Proportion of Auto-fluorescence

Subsequently, the present inventors have studied the proportion of auto-fluorescence from each of optical systems, such as microscopes and measuring apparatuses, using conventional common objective lenses, immersion substances, and cover glasses.

Light emitted from a light source, after being selected as a proper wavelength by a filter unit, such as a filter (for example, U-MWIB3 by OLYMPUS CORP.), passes through an illumination optical system as excitation light and irradiates a specimen. In this case, the objective lens, the immersion substance, and the cover glass, arranged in the illumination optical system, and a substance enclosed together with the specimen are excited to produce auto-fluorescence responsible for the noise. The present inventors have measured the amount of auto-fluorescence by using a detector such as a photomultiplier tube (Hamamatsu Photonics K. K.) mounted to the observation optical system or Model CoolSNAP HQ (Photometrics Inc.) that is a cooled CCD.

Noises in the fluorescence microscope system are roughly divided into two types: auto-fluorescence from the specimen and auto-fluorescence from the optical system. In the case where an upright microscope BX51 (OLYMPUS CORP.) is used for measurement, the proportion of auto-fluorescence from the specimen contained in the noise to auto-fluorescence from the optical system has been studied.

First, auto-fluorescence from the background of the specimen is measured by a common reflecting fluorescence observation method. The same measurement is then made in a state where the specimen is eliminated. The difference between values of these measurements indicates auto-fluorescence from the specimen and the remaining value is calculated as auto-fluorescence from the optical system.

Of the noises thus calculated, the auto-fluorescence from the specimen fluctuates in accordance with the condition of the preparation of the sample, such as the cleaning efficiency of the specimen described later. The present inventors have found that the tendencies of the degree of the influence of the auto-fluorescence from the specimen on the entire noise are roughly divided into three classes in accordance with the condition of the preparation of the specimen. By using the proportion of the noise of the auto-fluorescence from the optical system to the entire noise, these can be shown as follows:

Common (No Cleaning) Specimen:

$$\text{(Noise of auto-fluorescence from the optical system)}/B \geq 0.2 \quad (3'\text{-}1)$$

Cleaned Specimen:

$$\text{(Noise of auto-fluorescence from the optical system)}/B \geq 0.4 \quad (3'\text{-}2)$$

Thoroughly Cleaned Specimen:

$$\text{(Noise of auto-fluorescence from the optical system)}/B \geq 0.6 \quad (3'\text{-}3)$$

where, in Conditions (3'-1)-(3'-3), B is an average intensity value of auto-fluorescence of the background (a portion where the object to be observed or the object to be measured is absent in the observation region).

In each of Conditions (3'-1)-(3'-3), as the lower limit is increased, the proportion of the noise of the auto-fluorescence from the optical system becomes high, and when the auto-fluorescence from the optical system is improved, its improvement effect becomes more marked.

In order to improve the S/N ratio, it is necessary to know the breakdown of the noise of the auto-fluorescence from the optical system. Thus, the present inventors have studied the proportion of a noise (auto-fluorescence) value of each of the objective lens, the immersion substances, and the cover glass. For the measurement, the same method as in the case where the proportion of the auto-fluorescence from the specimen to the auto-fluorescence from the optical system mentioned above has been studied is used.

First, the amount of auto-fluorescence detected in a state (an actual working state) where the objective lens, the immersion substance, and the cover glass are properly arranged in the illumination optical system is measured. After that, the amount of auto-fluorescence is measured in a state where the cover glass is removed from the optical system, and then in a state where the immersion oil is removed from the optical system. By taking the difference between these values, the value of auto-fluorescence from each of the objective lens, the immersion oil, and the cover glass is calculated.

The measurement of the value of auto-fluorescence from each of Model UPLSAPO60XO (OLYMPUS CORP.), the immersion oil (OLYMPUS CORP.), and a commonly used cover glass (MATSUNAMI GLASS IND., LTD.) shows that the values of auto-fluorescence from the objective lens, the immersion oil, and the cover glass are almost the same.

As a result, it is found that, of auto-fluorescence contained in the noise of the entire observation optical system (or measuring optical system), the objective lens accounts for about 30%, the immersion oil for about 30%, the cover glass for about 30%, and the other for about 10%. In the feeble-fluorescence observation (or measurement), it becomes clear that the auto-fluorescence from the objective lens, the immersion substance, and the cover glass undergoes deterioration in quality and lies at a level that cannot be neglected for the maintenance of performance of the entire system.

As a result of the study, the present inventors have ascertained that, in order to improve the S/N ratio by 5%, it is necessary to reduce auto-fluorescence from at least one of the objective lens, the immersion substance, and the cover glass by 30% or the entire auto-fluorescence from them by 10%.

From the above description, the present inventors have studied the specimen, the application, the S/N ratio in their combination, and conditions required to improve the S/N ratio and have completed the present invention.

Specifically, the fluorescence observation or fluorescence measuring system comprises at least one of a low-fluorescence objective lens including optical elements made of low-fluorescence glass, a low-fluorescence immersion substance, and a low-fluorescence cover glass. The fluorescence observation or fluorescence measuring system of the present invention comprises a low-fluorescence objective lens including optical elements made of low-fluorescence glass. The low-fluorescence objective lens satisfies the following condition:

$$B_{OB}'/B_{OB} \leq 0.7 \quad (1a\text{-}1)$$

where $B_{OB}'$ is an average intensity value of auto-fluorescence from the low-fluorescence objective lens and $B_{OB}$ is an average intensity value of auto-fluorescence from a conventional objective lens generally used.

The upper limit of Condition (1a-1) is derived from the above description that "in order to improve the S/N ratio by 5%, it is necessary to reduce auto-fluorescence from at least one of the objective lens, the immersion substance, and the cover glass by 30%".

The fluorescence observation or fluorescence measuring system according to the present invention comprises a low-fluorescence objective lens including optical elements made of low-fluorescence glass. It is more desirable that the low-fluorescence objective lens satisfies the following condition:

$$B_{OB}'/B_{OB} \leq 0.5 \quad (1a\text{-}2)$$

where $B_{OB}'$ is an average intensity value of auto-fluorescence from the low-fluorescence objective lens and $B_{OB}$ is an average intensity value of auto-fluorescence from a conventional objective lens generally used.

The fluorescence observation or fluorescence measuring system of the present invention comprises a low-fluorescence objective lens including optical elements made of low-fluorescence glass. It is much more desirable that the low-fluorescence objective lens satisfies the following condition:

$$B_{OB}'/B_{OB} \leq 0.3 \quad (1a\text{-}3)$$

where $B_{OB}'$ is an average intensity value of auto-fluorescence from the low-fluorescence objective lens and $B_{OB}$ is an average intensity value of auto-fluorescence from a conventional objective lens generally used.

The fluorescence observation or fluorescence measuring system of the present invention comprises a low-fluorescence immersion substance. The low-fluorescence immersion substance satisfies the following condition:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The upper limit of Condition (1b-1) is derived from the above description that "in order to improve the S/N ratio by 5%, it is necessary to reduce auto-fluorescence from at least one of the objective lens, the immersion substance, and the cover glass by 30%".

The fluorescence observation or fluorescence measuring system of the present invention comprises a low-fluorescence immersion substance. The low-fluorescence immersion substance satisfies the following condition and a refractive index nd of the low-fluorescence immersion substance at the d line (587.56 nm) ranges from above 1.50 to below 1.70:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The upper limit of Condition (1b-1) is derived from the above description that "in order to improve the S/N ratio by 5%, it is necessary to reduce auto-fluorescence from at least one of the objective lens, the immersion substance, and the cover glass by 30%".

The fluorescence observation or fluorescence measuring system of the present invention comprises a low-fluorescence immersion substance. The low-fluorescence immersion substance satisfies the following condition and a refractive index nd of the low-fluorescence immersion substance at the d line (587.56 nm) is above 1.70:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The upper limit of Condition (1b-1) is derived from the above description that "in order to improve the S/N ratio by 5%, it is necessary to reduce auto-fluorescence from at least one of the objective lens, the immersion substance, and the cover glass by 30%".

The fluorescence observation or fluorescence measuring system of the present invention comprises a low-fluorescence immersion substance. The low-fluorescence immersion substance includes diiodomethane in which sulfur is dissolved and satisfies the following condition, and a refractive index nd of the low-fluorescence immersion substance at the d line (587.56 nm) is above 1.70:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The upper limit of Condition (1b-1) is derived from the above description that "in order to improve the S/N ratio by 5%, it is necessary to reduce auto-fluorescence from at least one of the objective lens, the immersion substance, and the cover glass by 30%".

The fluorescence observation or fluorescence measuring system of the present invention comprises a low-fluorescence immersion substance. The low-fluorescence immersion substance satisfies the following condition and a refractive index nd of the low-fluorescence immersion substance at the d line (587.56 nm) is above 1.78:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The upper limit of Condition (1b-1) is derived from the above description that "in order to improve the S/N ratio by 5%, it is necessary to reduce auto-fluorescence from at least one of the objective lens, the immersion substance, and the cover glass by 30%".

The fluorescence observation or fluorescence measuring system of the present invention comprises a low-fluorescence immersion substance. The low-fluorescence immersion substance includes diiodomethane in which sulfur is dissolved and satisfies the following condition, and a refractive index nd of the low-fluorescence immersion substance at the d line (587.56 nm) is above 1.78:

$$B_{IM}'/B_{IM} \leq 0.7 \quad (1b\text{-}1)$$

where $B_{IM}'$ is an average intensity value of auto-fluorescence from the low-fluorescence immersion substance and $B_{IM}$ is an average intensity value of auto-fluorescence from a conventional immersion substance generally used.

The upper limit of Condition (1b-1) is derived from the above description that "in order to improve the S/N ratio by 5%, it is necessary to reduce auto-fluorescence from at least one of the objective lens, the immersion substance, and the cover glass by 30%".

The fluorescence observation or fluorescence measuring system of the present invention comprises a low-fluorescence immersion substance. It is more desirable that the low-fluorescence immersion substance satisfies the following condition:

$$B_{IM}'/B_{IM} \leq 0.5 \quad (1b\text{-}2)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is more desirable that the low-fluorescence immersion substance satisfies the following condition and a refractive index nd of the low-fluorescence immersion substance at the d line (587.56 nm) ranges from above 1.50 to below 1.70:

$$B_{IM}'/B_{IM} \leq 0.5 \quad (1b\text{-}2)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is more desirable that the low-fluorescence immersion substance satisfies the following condition and a refractive index nd of the low-fluorescence immersion substance at the d line (587.56 nm) is above 1.70:

$$B_{IM}'/B_{IM} \leq 0.5 \quad (1b\text{-}2)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is more desirable that the low-fluorescence immersion substance includes diiodomethane in which sulfur is dissolved and satisfies the following condition, and a refractive index nd of the low-fluorescence immersion substance at the d line (587.56 nm) is above 1.70:

$$B_{IM}'/B_{IM} \leq 0.5 \quad (1b\text{-}2)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is more desirable that the low-fluorescence immersion substance satisfies the following condition and a refractive index nd of the low-fluorescence immersion substance at the d line (587.56 nm) is above 1.78:

$$B_{IM}'/B_{IM} \leq 0.5 \quad (1b\text{-}2)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is more desirable that the low-fluorescence immersion substance includes diiodomethane in which sulfur is dissolved and satisfies the following condition, and a refractive index nd of the low-fluorescence immersion substance at the d line (587.56 nm) is above 1.78:

$$B_{IM}'/B_{IM} \leq 0.5 \quad (1b\text{-}2)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is desirable that the low-fluorescence immersion substance satisfies the following condition:

$$B_{IM}'/B_{IM} \leq 0.3 \quad (1b\text{-}3)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is further desirable that the low-fluorescence immersion substance satisfies the following condition and a refractive index nd of the low-fluorescence immersion substance at the d line (587.56 nm) ranges from above 1.50 to below 1.70:

$$B_{IM}'/B_{IM} \leq 0.3 \quad (1b\text{-}3)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is more desirable that the low-fluorescence immersion substance satisfies the following condition and a refractive index nd of the low-fluorescence immersion substance at the d line (587.56 nm) is above 1.70:

$$B_{IM}'/B_{IM} \leq 0.3 \quad (1b\text{-}3)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is more desirable that the low-fluorescence immersion substance includes diiodomethane in which sulfur is dissolved and satisfies the following condition, and a refractive index nd of the low-fluorescence immersion substance at the d line (587.56 nm) is above 1.70:

$$B_{IM}'/B_{IM} \leq 0.3 \quad (1b\text{-}3)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is much more desirable that the low-fluorescence immersion substance satisfies the following condition and a refractive index nd of the low-fluorescence immersion substance at the d line (587.56 nm) is above 1.78:

$$B_{IM}'/B_{IM} \leq 0.3 \quad (1b\text{-}3)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence immersion substance. It is more desirable that the low-fluorescence immersion substance includes diiodomethane in which sulfur is dissolved and satisfies the following condition, and a refractive index nd of the low-fluorescence immersion substance at the d line (587.56 nm) is above 1.78:

$$B_{IM}'/B_{IM} \leq 0.3 \quad (1b\text{-}3)$$

where $B_{IM}'$ is an average intensity value of auto-fluorescence from the low-fluorescence immersion substance and $B_{IM}$ is an average intensity value of auto-fluorescence from a conventional immersion substance generally used.

The fluorescence observation or fluorescence measuring system of the present invention comprises a low-fluorescence cover glass. The low-fluorescence cover glass satisfies the following condition:

$$B_{CG}'/B_{CG} \leq 0.7 \quad (1C\text{-}1)$$

where $B_{CG}'$ is an average intensity value of auto-fluorescence from the low-fluorescence cover glass and $B_{CG}$ is an average intensity value of auto-fluorescence from a conventional cover glass generally used.

The upper limit of Condition (1c-1) is derived from the above description that "in order to improve the S/N ratio by 5%, it is necessary to reduce auto-fluorescence from at least one of the objective lens, the immersion substance, and the cover glass by 30%".

The fluorescence observation or fluorescence measuring system of the present invention comprises a low-fluorescence cover glass. It is more desirable that the low-fluorescence cover glass satisfies the following condition:

$$B_{CG}'/B_{CG} \leq 0.5 \quad (1c\text{-}2)$$

where $B_{CG}'$ is an average intensity value of auto-fluorescence from the low-fluorescence cover glass and $B_{CG}$ is an average intensity value of auto-fluorescence from a conventional cover glass generally used.

The fluorescence observation or fluorescence measuring system of the present invention comprises a low-fluorescence cover glass. It is much more desirable that the low-fluorescence cover glass satisfies the following condition:

$$B_{CG}'/B_{CG} \leq 0.3 \quad (1c\text{-}3)$$

where $B_{CG}'$ is an average intensity value of auto-fluorescence from the low-fluorescence cover glass and $B_{CG}$ is an average intensity value of auto-fluorescence from a conventional cover glass generally used.

The fluorescence observation or fluorescence measuring method of the present invention comprises the steps of:
A. selecting a specimen emitting fluorescent light that uses a living cell,
B. selecting an application for observing or measuring the specimen selected in Step A and the fluorescence observation or fluorescence measuring system comprising at least one of a low-fluorescence objective lens including optical elements made of low-fluorescence glass, satisfying Condition (1a-1) described below, a low-fluorescence immersion substance satisfying Condition (1b-1) described below, and a low-fluorescence cover glass satisfying Condition (1c-1) described below, and
C. making the fluorescence observation or fluorescence measurement of the specimen selected in Step A by using the application and the system selected in Step B:

$$B_{OB}'/B_{OB} \leq 0.7 \quad (1a\text{-}1)$$

$$B_{IM}'/B_{IM} \leq 0.7 \quad (1b\text{-}1)$$

$$B_{CG}'/B_{CG} \leq 0.7 \quad (1c\text{-}1)$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, and $B_{CG}$ is an average intensity value of auto-fluorescence from a conventional cover glass generally used.

The upper limit of each of Conditions (1a-1), (1b-1), and (1c-1) is derived from the above description that "in order to improve the S/N ratio by 5%, it is necessary to reduce auto-fluorescence from at least one of the objective lens, the immersion substance, and the cover glass by 30%".

In the fluorescence observation or fluorescence measuring method of the present invention, it is more desirable to comprising the steps of:
A. selecting a specimen emitting fluorescent light that uses a living cell,
B. selecting an application for observing or measuring the specimen selected in Step A and the fluorescence observation or fluorescence measuring system comprising at least one of a low-fluorescence objective lens including optical elements made of low-fluorescence glass, satisfying Condition (1a-2) described below, a low-fluorescence immersion substance satisfying Condition (1b-2) described below, and a low-fluorescence cover glass satisfying Condition (1c-2) described below, and
C. making the fluorescence observation or fluorescence measurement of the specimen selected in Step A by using the application and the system selected in Step B:

$$B_{OB}'/B_{OB} \leq 0.5 \quad (1a\text{-}2)$$

$$B_{IM}'/B_{IM} \leq 0.5 \quad (1b\text{-}2)$$

$$B_{CG}'/B_{CG} \leq 0.5 \quad (1c\text{-}2)$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, and $B_{CG}$ is an average intensity value of auto-fluorescence from a conventional cover glass generally used.

In the fluorescence observation or fluorescence measuring method of the present invention, it is more desirable to comprising the steps of:

A. selecting a specimen emitting fluorescent light that uses a living cell,
B. selecting an application for observing or measuring the specimen selected in Step A and the fluorescence observation or fluorescence measuring system comprising at least one of a low-fluorescence objective lens including optical elements made of low-fluorescence glass, satisfying Condition (1a-3) described below, a low-fluorescence immersion substance satisfying Condition (1b-3) described below, and a low-fluorescence cover glass satisfying Condition (1c-3) described below, and
C. making the fluorescence observation or fluorescence measurement of the specimen selected in Step A by using the application and the system selected in Step B:

$$B_{OB}'/B_{OB} \leq 0.3 \tag{1a-3}$$

$$B_{IM}'/B_{IM} \leq 0.3 \tag{1b-3}$$

$$B_{CG}'/B_{CG} \leq 0.3 \tag{1c-3}$$

where $B_{OB}'$ is an average intensity value of auto-fluorescence from the low-fluorescence objective lens, $B_{OB}$ is an average intensity value of auto-fluorescence from a conventional objective lens generally used, $B_{IM}'$ is an average intensity value of auto-fluorescence from the low-fluorescence immersion substance, $B_{IM}$ is an average intensity value of auto-fluorescence from a conventional immersion substance generally used, $B_{CG}'$ is an average intensity value of auto-fluorescence from the low-fluorescence cover glass, and $B_{CG}$ is an average intensity value of auto-fluorescence from a conventional cover glass generally used.

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 5 \tag{2-1}$$

$$(B_{OB}+B_{IM}+B_{CG})/B \geq 0.2 \tag{3-1}$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, $B_{OB}$ is an average intensity value of auto-fluorescence from a conventional objective lens generally used, $B_{IM}$ is an average intensity value of auto-fluorescence from a conventional immersion substance generally used, and $B_{CG}$ is an average intensity value of auto-fluorescence from a conventional cover glass generally used.

The upper limit of Condition (2-1) is made to correspond to the S/N ratio of the application required for the fluorescence observation and measurement of "Specimen with common brightness" in ranking of brightness of the specimen described above.

The lower limit of Condition (3-1) is made to correspond to Condition (3'-1) regarding "Common (no cleaning) specimen" in the proportion of the noise of auto-fluorescence from the optical system to the entire noise, mentioned above. The left side of Condition (3-1) is derived from the above description that "of auto-fluorescence contained in the noise of the entire observation optical system (or measuring optical system), the objective lens accounts for about 30%, the immersion oil for about 30%, and the cover glass for about 30%" and from Condition (3'-1).

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 5 \tag{2-1}$$

$$3B_{OB}/B \geq 0.2 \tag{3a-1}$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, and $B_{OB}$ is an average intensity value of auto-fluorescence from a conventional objective lens generally used.

The upper limit of Condition (2-1) is made to correspond to the S/N ratio of the application required for the fluorescence observation and measurement of "Specimen with common brightness" in ranking of brightness of the specimen described above.

The lower limit of Condition (3a-1) is made to correspond to Condition (3'-1) regarding "Common (no cleaning) specimen" in the proportion of the noise of auto-fluorescence from the optical system to the entire noise, mentioned above. The left side of Condition (3a-1) is derived from the above description that "of auto-fluorescence contained in the noise of the entire observation optical system (or measuring optical system), the objective lens accounts for about 30%, the immersion oil for about 30%, and the cover glass for about 30%" and that the proportion of the noise of each of the objective lens, the immersion substance, and the cover glass to the entire optical system is the same, and from Condition (3'-1), by replacing the proportion of the noise of auto-fluorescence from the immersion substance and the cover glass, of the noise of auto-fluorescence from the optical system, with the proportion of the noise of auto-fluorescence from the objective lens.

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 5 \tag{2-1}$$

$$3B_{IM}/B \geq 0.2 \tag{3b-1}$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, and $B_{IM}$ is an average intensity value of auto-fluorescence from a conventional immersion substance generally used.

The upper limit of Condition (2-1) is made to correspond to the S/N ratio of the application required for the fluorescence observation and measurement of "Specimen with common brightness" in ranking of brightness of the specimen described above.

The lower limit of Condition (3b-1) is made to correspond to Condition (3'-1) regarding "Common (no cleaning) specimen" in the proportion of the noise of auto-fluorescence from the optical system to the entire noise, mentioned above. The left side of Condition (3b-1) is derived from the above description that "of auto-fluorescence contained in the noise of the entire observation optical system (or measuring optical system), the objective lens accounts for about 30%, the immersion oil for about 30%, and the cover glass for about 30%" and that the proportion of the noise of each of the objective lens, the immersion substance, and the cover glass to the entire optical system is the same, and from Condition (3'-1), by replacing the proportion of the noise of auto-fluorescence from the objective lens and the cover glass to the noise of auto-fluorescence from the optical system, with the proportion of the noise of auto-fluorescence from the immersion substance.

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 5 \qquad (2-1)$$

$$3B_{CG}/B \geq 0.2 \qquad (3c-1)$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, and $B_{CG}$ is an average intensity value of auto-fluorescence from a conventional cover glass generally used.

The upper limit of Condition (2-1) is made to correspond to the S/N ratio of the application required for the fluorescence observation and measurement of "Specimen with common brightness" in ranking of brightness of the specimen described above.

The lower limit of Condition (3c-1) is made to correspond to Condition (3'-1) regarding "Common (no cleaning) specimen" in the proportion of the noise of auto-fluorescence from the optical system to the entire noise, mentioned above. The left side of Condition (3c-1) is derived from the above description that "of auto-fluorescence contained in the noise of the entire observation optical system (or measuring optical system), the objective lens accounts for about 30%, the immersion oil for about 30%, and the cover glass for about 30%" and that the proportion of the noise of each of the objective lens, the immersion substance, and the cover glass to the entire optical system is the same, and from Condition (3'-1), by replacing the proportion of the noise of auto-fluorescence from the objective lens and the immersion substance to the noise of auto-fluorescence from the optical system, with the proportion of the noise of auto-fluorescence from the cover glass.

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 3 \qquad (2-2)$$

$$(B_{OB}+B_{IM}+B_{CG})/B \geq 0.4 \qquad (3-2)$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, $B_{OB}$ is an average intensity value of auto-fluorescence from a conventional objective lens generally used, $B_{IM}$ is an average intensity value of auto-fluorescence from a conventional immersion substance generally used, and $B_{CG}$ is an average intensity value of auto-fluorescence from a conventional cover glass generally used.

The upper limit of Condition (2-2) is made to correspond to the S/N ratio of the application required for the fluorescence observation and measurement of "Dark specimen" in ranking of brightness of the specimen described above.

The lower limit of Condition (3-2) is made to correspond to Condition (3'-2) regarding "Cleaned specimen" in the proportion of the noise of auto-fluorescence from the optical system to the entire noise, mentioned above. The left side of Condition (3-2) is derived from the above description that "of auto-fluorescence contained in the noise of the entire observation optical system (or measuring optical system), the objective lens accounts for about 30%, the immersion oil for about 30%, and the cover glass for about 30%" and from Condition (3'-2).

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 3 \qquad (2-2)$$

$$3B_{OB}/B \geq 0.4 \qquad (3a-2)$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, and $B_{OB}$ is an average intensity value of auto-fluorescence from a conventional objective lens generally used.

The upper limit of Condition (2-2) is made to correspond to the S/N ratio of the application required for the fluorescence observation and measurement of "Dark specimen" in ranking of brightness of the specimen described above.

The lower limit of Condition (3a-2) is made to correspond to Condition (3'-2) regarding "Cleaned specimen" in the proportion of the noise of auto-fluorescence from the optical system to the entire noise, mentioned above. The left side of Condition (3a-2) is derived from the above description that "of auto-fluorescence contained in the noise of the entire observation optical system (or measuring optical system), the objective lens accounts for about 30%, the immersion oil for about 30%, and the cover glass for about 30%" and that the proportion of the noise of each of the objective lens, the immersion substance, and the cover glass to the entire optical system is the same, and from Condition (3'-2), by replacing the proportion of the noise of auto-fluorescence from the immersion substance and the cover glass, of the noise of auto-fluorescence from the optical system, with the proportion of the noise of auto-fluorescence from the objective lens.

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 3 \qquad (2-2)$$

$$3B_{IM}/B \geq 0.4 \qquad (3b-2)$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, and $B_{IM}$ is an average intensity value of auto-fluorescence from a conventional immersion substance generally used.

The upper limit of Condition (2-2) is made to correspond to the S/N ratio of the application required for the fluorescence observation and measurement of "Dark specimen" in ranking of brightness of the specimen described above.

The lower limit of Condition (3b-2) is made to correspond to Condition (3'-2) regarding "Cleaned specimen" in the proportion of the noise of auto-fluorescence from the optical system to the entire noise, mentioned above. The left side of Condition (3b-2) is derived from the above description that "of auto-fluorescence contained in the noise of the entire observation optical system (or measuring optical system), the objective lens accounts for about 30%, the immersion oil for about 30%, and the cover glass for about 30%" and that the proportion of the noise of each of the objective lens, the immersion substance, and the cover glass to the entire optical system is the same, and from Condition (3'-2), by replacing the proportion of the noise of auto-fluorescence from the objective lens and the cover glass, of the noise of auto-fluorescence from the optical system, with the proportion of the noise of auto-fluorescence from the immersion substance.

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 3 \quad (2\text{-}2)$$

$$3B_{CG}/B \geq 0.4 \quad (3c\text{-}2)$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, and $B_{CG}$ is an average intensity value of auto-fluorescence from a conventional cover glass generally used.

The upper limit of Condition (2-2) is made to correspond to the S/N ratio of the application required for the fluorescence observation and measurement of "Dark specimen" in ranking of brightness of the specimen described above.

The lower limit of Condition (3c-2) is made to correspond to Condition (3'-2) regarding "Cleaned specimen" in the proportion of the noise of auto-fluorescence from the optical system to the entire noise, mentioned above. The left side of Condition (3c-2) is derived from the above description that "of auto-fluorescence contained in the noise of the entire observation optical system (or measuring optical system), the objective lens accounts for about 30%, the immersion oil for about 30%, and the cover glass for about 30%" and that the proportion of the noise of each of the objective lens, the immersion substance, and the cover glass to the entire optical system is the same, and from Condition (3'-2), by replacing the proportion of the noise of auto-fluorescence from the objective lens and the immersion substance, of the noise of auto-fluorescence from the optical system, with the proportion of the noise of auto-fluorescence from the cover glass.

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 2 \quad (2\text{-}3)$$

$$(B_{OB}+B_{IM}+B_{CG})/B \geq 0.6 \quad (3\text{-}3)$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, $B_{OB}$ is an average intensity value of auto-fluorescence from a conventional objective lens generally used, $B_{IM}$ is an average intensity value of auto-fluorescence from a conventional immersion substance generally used, and $B_{CG}$ is an average intensity value of auto-fluorescence from a conventional cover glass generally used.

The upper limit of Condition (2-3) is made to correspond to the S/N ratio of the application required for the fluorescence observation and measurement of "Single molecule" in ranking of brightness of the specimen described above.

The lower limit of Condition (3-3) is made to correspond to Condition (3'-3) regarding "Thoroughly cleaned specimen" in the proportion of the noise of auto-fluorescence from the optical system to the entire noise, mentioned above. The left side of Condition (3-3) is derived from the above description that "of auto-fluorescence contained in the noise of the entire observation optical system (or measuring optical system), the objective lens accounts for about 30%, the immersion oil for about 30%, and the cover glass for about 30%" and from Condition (3'-3).

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 2 \quad (2\text{-}3)$$

$$3B_{OB}/B \geq 0.6 \quad (3a\text{-}3)$$

here S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, and $B_{OB}$ is an average intensity value of auto-fluorescence from a conventional objective lens generally used.

The upper limit of Condition (2-3) is made to correspond to the S/N ratio of the application required for the fluorescence observation and measurement of "Single molecule" in ranking of brightness of the specimen described above.

The lower limit of Condition (3a-3) is made to correspond to Condition (3'-3) regarding "Thoroughly cleaned specimen" in the proportion of the noise of auto-fluorescence from the optical system to the entire noise, mentioned above. The left side of Condition (3a-3) is derived from the above description that "of auto-fluorescence contained in the noise of the entire observation optical system (or measuring optical system), the objective lens accounts for about 30%, the immersion oil for about 30%, and the cover glass for about 30%" and that the proportion of the noise of each of the objective lens, the immersion substance, and the cover glass to the entire optical system is the same, and from Condition (3'-3), by replacing the proportion of the noise of auto-fluorescence from the immersion substance and the cover glass, of the noise of auto-fluorescence from the optical system, with the proportion of the noise of auto-fluorescence from the objective lens.

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leq 2 \quad (2\text{-}3)$$

$$3B_{IM}/B \geq 0.6 \quad (3b\text{-}3)$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, and $B_{IM}$ is an average intensity value of auto-fluorescence from a conventional immersion substance generally used.

The upper limit of Condition (2-3) is made to correspond to the S/N ratio of the application required for the fluorescence observation and measurement of "Single molecule" in ranking of brightness of the specimen described above.

The lower limit of Condition (3b-3) is made to correspond to Condition (3'-3) regarding "Thoroughly cleaned specimen" in the proportion of the noise of auto-fluorescence from the optical system to the entire noise, mentioned above. The left side of Condition (3b-3) is derived from the above description that "of auto-fluorescence contained in the noise of the entire observation optical system (or measuring optical system), the objective lens accounts for about 30%, the immersion oil for about 30%, and the cover glass for about 30%" and that the proportion of the noise of each of the objective lens, the immersion substance, and the cover glass to the entire optical system is the same, and from Condition (3'-3), by replacing the proportion of the noise of auto-fluorescence from the objective lens and the cover glass, of the noise of auto-fluorescence from the optical system, with the proportion of the noise of auto-fluorescence from the immersion substance.

In the fluorescence observation or fluorescence measuring method of the present invention, it is desirable that a specimen emitting fluorescent light that uses a living cell, selected in Step A, satisfies at least one of the following conditions:

$$(S-s)/(B+b) \leqq 2 \quad (2\text{-}3)$$

$$3B_{CG}/B \geqq 0.6 \quad (3\text{c-}3)$$

where S is an average intensity value of fluorescent light emanating from the specimen, s is a fluctuation range of the intensity of the fluorescent light, B is an average intensity value of background noise in the absence of the specimen, b is a fluctuation range of the intensity of the back ground noise, and $B_{CG}$ is an average intensity value of auto-fluorescence from a conventional cover glass generally used.

The upper limit of Condition (2-3) is made to correspond to the S/N ratio of the application required for the fluorescence observation and measurement of "Single molecule" in ranking of brightness of the specimen described above.

The lower limit of Condition (3c-3) is made to correspond to Condition (3'-3) regarding "Thoroughly cleaned specimen" in the proportion of the noise of auto-fluorescence from the optical system to the entire noise, mentioned above. The left side of Condition (3c-3) is derived from the above description that "of auto-fluorescence contained in the noise of the entire observation optical system (or measuring optical system), the objective lens accounts for about 30%, the immersion oil for about 30%, and the cover glass for about 30%" and that the proportion of the noise of each of the objective lens, the immersion substance, and the cover glass to the entire optical system is the same, and from Condition (3'-3), by replacing the proportion of the noise of auto-fluorescence from the objective lens and the immersion substance, of the noise of auto-fluorescence from the optical system, with the proportion of the noise of auto-fluorescence from the cover glass.

In the fluorescence observation or fluorescence measuring method of the present invention, it is desirable that the application selected in Step B is FRET (fluorescence resonance energy transfer).

In the fluorescence observation or fluorescence measuring method of the present invention, it is desirable that the system selected in Step B is a fluorescence microscope system.

In the fluorescence observation or fluorescence measuring method of the present invention, it is desirable that the system selected in Step B is a totally reflecting microscope system.

In the fluorescence observation or fluorescence measuring method of the present invention, it is desirable that the system selected in Step B is constructed as a microscope system in which two fluorescence microscopes or two totally reflecting microscopes, or one fluorescence microscope and one totally reflecting microscope are arranged so that an objective optical system is located opposite to the specimen interposed between two microscopes.

Subsequently, the embodiments of the fluorescence observation system, the fluorescence measuring system, the fluorescence observation method, and the fluorescence measuring method of the present invention will be described with reference to the drawings.

An example of the structure of the conventional fluorescence microscope system is first shown below.

Figure 2:
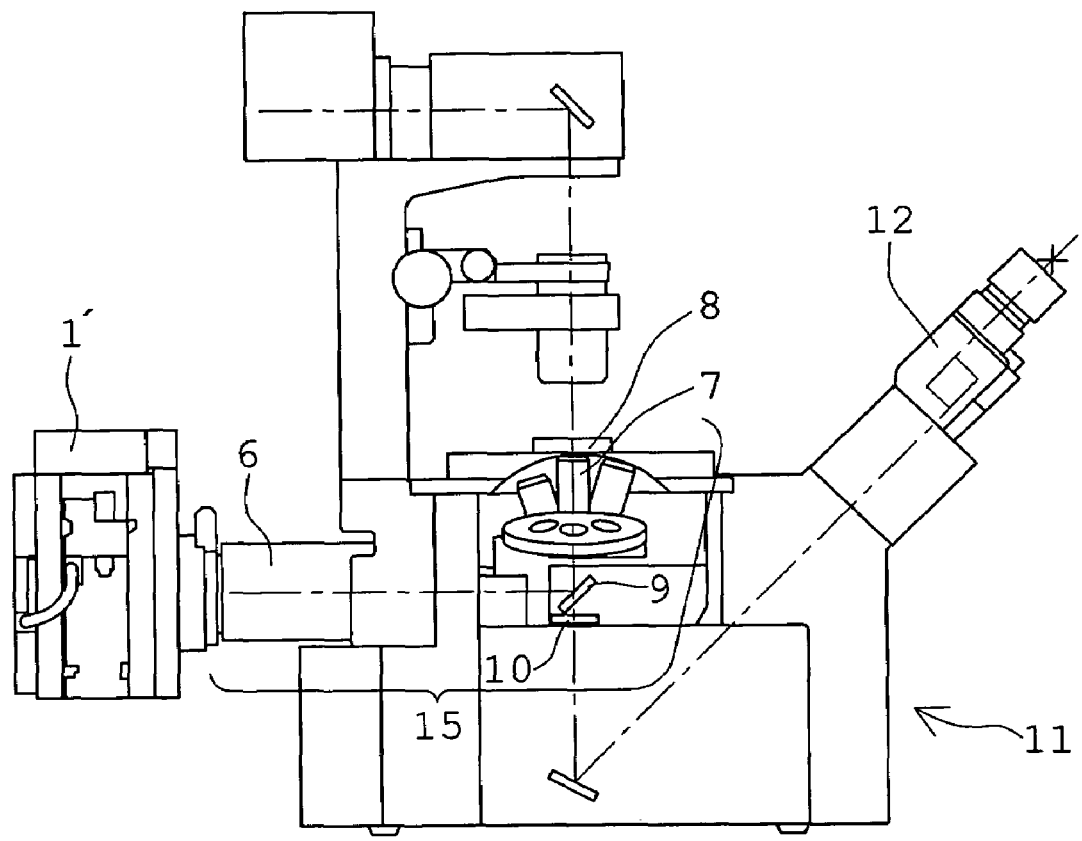
FIG. 2 is a side view showing schematically an example of a conventional inverted reflecting fluorescence microscope apparatus using a white arc light source, to which the fluorescence observation or fluorescence measuring system of each embodiment of the present invention is applicable.

FIGS. 1 and 2 are side views showing structural examples of conventional inverted fluorescence microscope apparatuses. FIG. 1 shows schematically a reflecting fluorescence microscope apparatus using a laser light source, and FIG. 2 shows schematically a reflecting fluorescence microscope apparatus using a white arc light source. FIGS. 3A and 3B are schematic views of arrangements of essential parts of an illumination optical system in the fluorescence microscope apparatus of FIG. 1, showing an arrangement of optical members in an ordinary fluorescence observation and in a total reflection fluorescence observation, respectively.

For convenience, the microscope apparatus of FIG. 1 will be described here. The microscope apparatus of FIG. 2 is such that a light source section is connected directly to a reflecting projection tube 6 by using an arc light source 1', but with the exception of this, the structure is nearly the same as in the microscope apparatus of FIG. 1.

The fluorescence microscope apparatus shown in FIG. 1 is constructed as a microscope provided with an illumination optical system that includes a laser light source 1; a laser introducing mechanism 2 having an introduction optical system introducing laser light oscillated from the laser light source 1 into an optical fiber 3; optical members ranging from a reflecting projection tube 6 to an objective lens 7, arranged as an irradiation optical system irradiating a specimen 8 with light emerging from the optical fiber 3; and an adapter 4 and a fiber position control knob 5, constituted as a mechanism capable of adjusting the position of the optical fiber 3 in the range from the position of the optical axis to a position shifted by a preset amount from the optical axis that provides evanescent illumination. Also, in FIG. 1, reference numeral 9 denotes a dichroic mirror, 10 denotes an absorption filter, 11 denotes a microscope body, and 12 denotes an observation lens barrel.

An irradiation optical system 15, as shown in FIGS. 3A and 3B, has the objective lens 7 placed on the side of the specimen 8 and a condenser lens 14 placed on the side of the optical fiber 3 (for example, the reflecting projection tube 6). Also, in these figures, reference numeral 16 represents an optical axis and 17 represents a cover glass. Reference symbol $F_B$ represents the back focal position of the objective lens 7. In FIGS. 3A and 3B, for convenience, the dichroic mirror 9 is eliminated and a distance from the optical fiber 3 to the objective lens 7 is shown as a straight line. The condenser lens 14 is designed to condense light emerging from the optical fiber 3 at or in the proximity of the back focal position of the objective lens 7.

The adapter 4, which joins the exit end of the optical fiber 3, is connected to the reflecting projection tube 6 so that laser light emerging from the optical fiber 3 is introduced into the reflecting projection tube 6. In the adapter 4, the exit end of the optical fiber 3 is held by the fiber position control knob 5. The adapter 4 is provided with a well-known mechanism in which the fiber position control knob 5 is operated from the exterior and thereby the exit end of the optical fiber 3 can be moved to the position of the optical axis (see FIG. 3A) or to the position shifted by a preset amount from the optical axis that provides evanescent illumination (see FIG. 3B). The microscope of FIG. 1 is constructed so that the fiber position control knob 5 is operated and thereby ordinary reflecting illumination in which the optical fiber 3 is located on the optical axis of the irradiation optical system (see FIG. 3A) and totally reflecting illumination in which the optical fiber 3 is located apart from the optical axis of the irradiation optical system by a preset amount (see FIG. 3B) can be switched to each other. Also, a space between the objective lens 7 and the specimen 8 is filled with an immersion substance 13.

Subsequently, the fluorescence microscope apparatuses of the embodiments of the present invention and of the comparative examples will be described. The fundamental schematic structures of these fluorescence microscope apparatuses are the same as in the conventional fluorescence microscope apparatuses shown in FIGS. 1 and 2. What follows is a description of only different components in the embodiments and comparative examples, and the explanation of identical components is eliminated.

COMPARATIVE EXAMPLE 1

Observations are first made by using the conventional fluorescence microscope apparatuses shown in FIGS. 1 and 2. The single-molecule fluorescence observation with ordinary reflecting fluorescence is carried out by using Model UPLSAPO60X made by OLYMPUS CORP. as the objective lens; MATSUNAMI MICRO COVER GLASS No. 1-S by MATSUNAMI GLASS IND., LTD. as the cover glass; the immersion oil (the refractive index nd=1.52) by OLYMPUS CORP. as the immersion substance; Model IX71 by OLYMPUS CORP. as the inverted microscope; and Model EM-CCD by Hamamatsu Photonics K. K. as the detector. The totally reflecting fluorescence observation by the totally reflecting fluorescence observation apparatus shown in FIG. 3B as well as the ordinary fluorescence observation is carried out. In addition, the FRET and the moving-picture observation are performed. The specimen satisfies Condition (2-3) (that is, $(S-s)/(B+b) \leq 2$) and Condition (3a-3) (that is, $3B_{OB}/B \geq 0.6$). In the fluorescence microscope apparatuses of Comparative example 1, background light produced by auto-fluorescence is intense and the single-molecule observation cannot be made.

Embodiment 1

Next, in each of the fluorescence microscope apparatuses used in Comparative example 1, observation is made by changing only the objective lens as described blow. In the objective lens of Embodiment 1, the magnification and NA are equivalent to those of Model UPLSAPO60X of Comparative example 1. When auto-fluorescence from the objective lens of Embodiment 1 is denoted by $B_{OB}'$ and auto-fluorescence from the objective lens used in Comparative example 1 is denoted by $B_{OB}$, the auto-fluorescence ratio satisfies Condition (1a-1) (namely, $B_{OB}'/B_{OB} \leq 0.7$).

When the objective lens of Embodiment 1 is used instead of the object lens of Comparative example 1 and the same specimen as in Comparative example 1 is observed under the same condition, the background light by the auto-fluorescence is reduced and it becomes possible to observe the single molecule.

COMPARATIVE EXAMPLE 2

The same fluorescence microscope apparatuses as in Comparative example 1 are used to perform the observation of the specimen satisfying Condition (2-2) (that is, $(S-s)/(B+b) \leq 3$) and Condition (3a-2) (that is, $3B_{OB}/B \geq 0.4$). The totally reflecting fluorescence observation by the totally reflecting fluorescence observation apparatus shown in FIG. 3B as well as the ordinary fluorescence observation is carried out. In addition, the FRET, the calcium ratio imaging, and the moving-picture observation are performed. In the observation image in this case, the entire image, as shown in FIG. 4B, is light and whitish in color and it is very difficult to observe a fine structure of the observation object.

Embodiment 2

In each of the fluorescence microscope apparatuses used in Comparative example 2, observation is made by changing only the objective lens as described blow. In the objective lens of Embodiment 2, the magnification and NA are equivalent to those of Model UPLSAPO60X of Comparative example 2. When auto-fluorescence from the objective lens of Embodiment 2 is denoted by $B_{OB}'$ and auto-fluorescence from the objective lens used in Comparative example 2 is denoted by $B_{OB}$, the auto-fluorescence ratio satisfies Condition (1a-2) (namely, $B_{OB}'/B_{OB} \leq 0.5$).

Figure 4A:
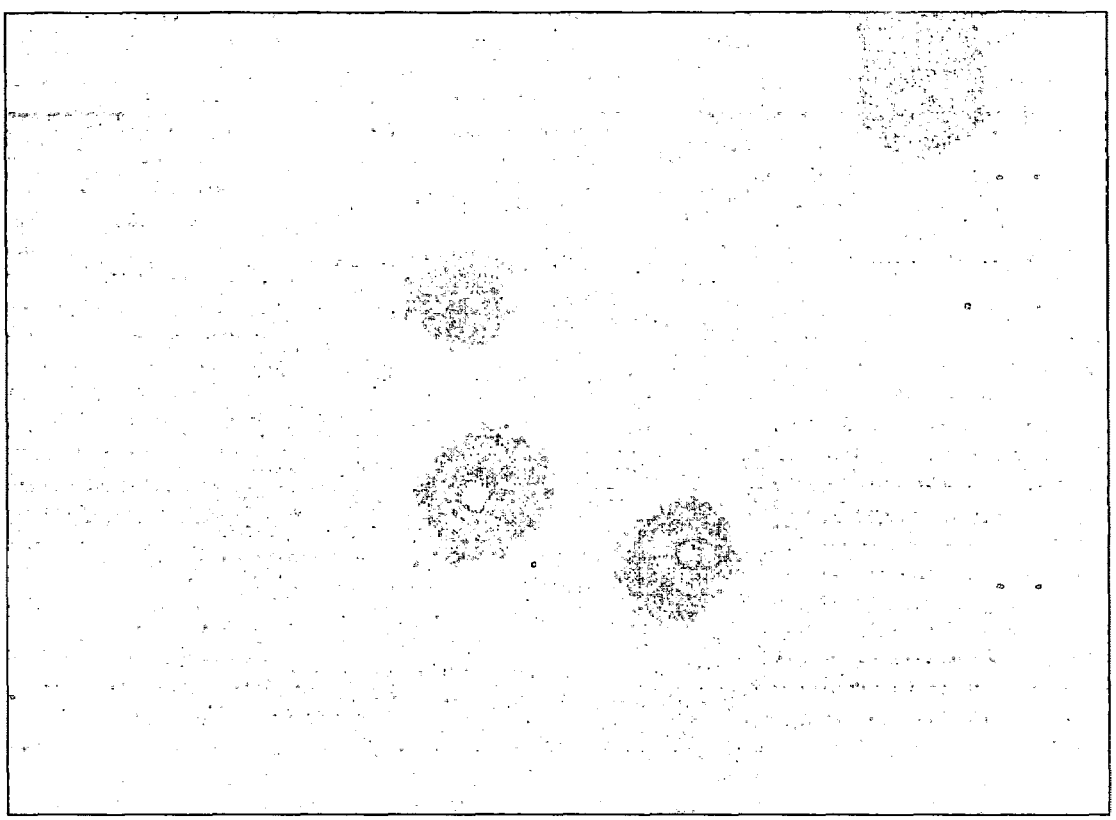
FIGS. 4A and 4B are substitutive photographs of observation images of specimens obtained by fluorescence microscope observations, showing an observation image in fluorescence microscope observations of Embodiments 2, 5, and 9 of the present invention and an observation image in fluorescence microscope observations of Comparative examples 2, 5, and 9, respectively.
Figure 4B:
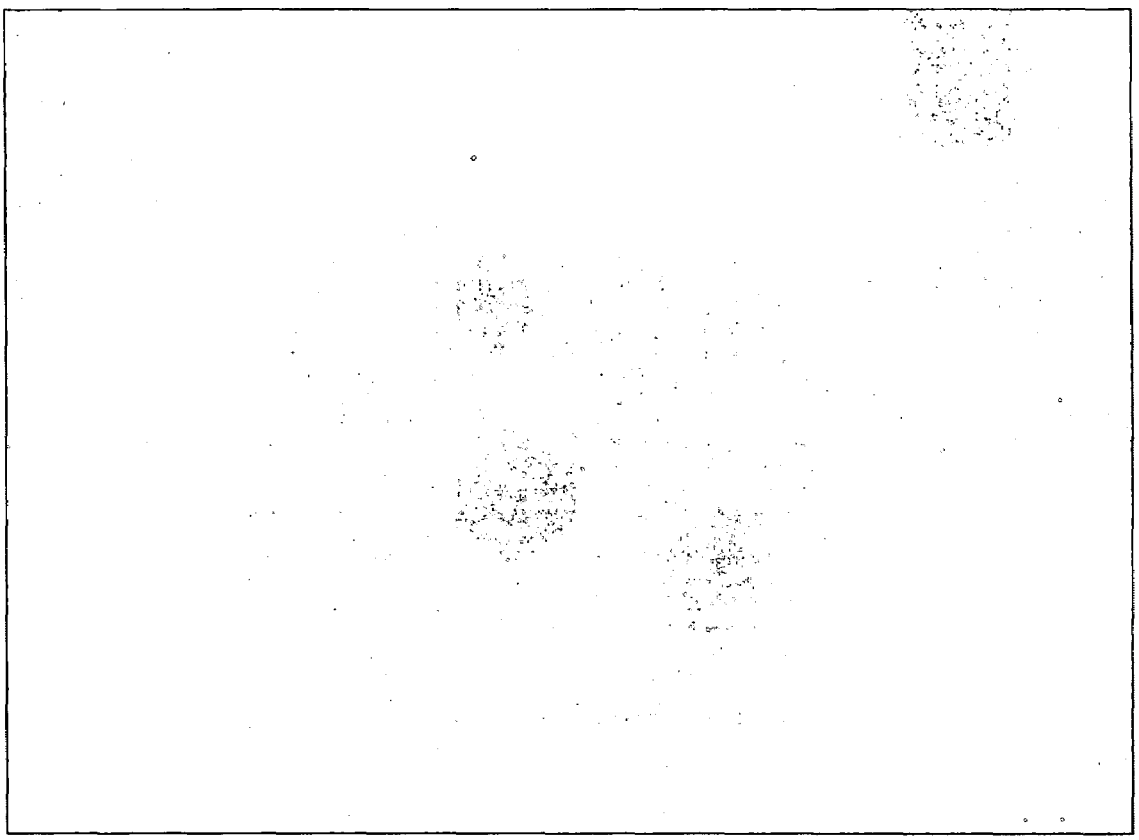

When the objective lens of Embodiment 2 is used instead of the object lens of Comparative example 2 and the same specimen as in Comparative example 2 is observed under the same condition, it can be confirmed that the fine structure of the observation object, as shown in FIG. 4A, can be sharply observed, the background light by the auto-fluorescence is reduced, and the S/N ratio of the observation image is improved.

COMPARATIVE EXAMPLE 3

The same fluorescence microscope apparatuses as in Comparative example 1 are used to perform the observation of the specimen satisfying Condition (2-1) (that is, $(S-s)/(B+b) \leq 5$) and Condition (3a-1) (that is, $3B_{OB}/B \geq 0.2$). The totally reflecting fluorescence observation by the totally reflecting fluorescence observation apparatus shown in FIG. 3B as well as the ordinary fluorescence observation is carried out. In addition, the FRET, the calcium ratio imaging, and the moving-picture observation are performed.

Embodiment 3

In each of the fluorescence microscope apparatuses used in Comparative example 3, observation is made by changing only the objective lens as described blow. In the objective lens of Embodiment 3, the magnification and NA are equivalent to those of Model UPLSAPO60X of Comparative example 3. When auto-fluorescence from the objective lens of Embodiment 3 is denoted by $B_{OB}'$ and auto-fluorescence from the objective lens used in Comparative example 3 is denoted by $B_{OB}$, the auto-fluorescence ratio satisfies Condition (1a-3) (namely, $B_{OB}'/B_{OB} \leq 0.3$).

When the objective lens of Embodiment 3 is used instead of the object lens of Comparative example 3 and the same specimen as in Comparative example 3 is observed under the same condition, it can be confirmed that the background light by the auto-fluorescence is reduced, and the S/N ratio of the observation image is improved.

COMPARATIVE EXAMPLE 4

Observations are first made by using the conventional fluorescence microscope apparatuses shown in FIGS. 1 and 2. The single-molecule fluorescence observation with ordinary reflecting fluorescence is carried out by using Model UPLSAPO60XO made by OLYMPUS CORP. as the objective lens; MATSUNAMI MICRO COVER GLASS No. 1-S by MATSUNAMI GLASS IND., LTD. as the cover glass; the immersion oil (the refractive index nd=1.52) by OLYMPUS CORP. as the immersion substance; Model IX71 by OLYMPUS CORP. as the inverted microscope; and Model EM-CCD by Hamamatsu Photonics K. K. as the detector. The totally reflecting fluorescence observation by the totally reflecting fluorescence observation apparatus shown in FIG. 3B as well as the ordinary fluorescence observation is carried out. In addition, the FRET and the moving-picture observation are performed. The specimen satisfies Condition (2-3) (that is, $(S-s)/(B+b) \leq 2$) and Condition (3c-3) (that is, $3B_{CG}/B \geq 0.6$). In the fluorescence microscope apparatuses of Comparative example 4, background light produced by auto-fluorescence is intense and the single-molecule observation cannot be made.

Embodiment 4

In each of the fluorescence microscope apparatuses used in Comparative example 4, observation is made by changing only the cover glass as described blow. In the cover glass of Embodiment 4, the refractive index and the Abbe's number are equivalent to those of the cover glass of Comparative example 4. When auto-fluorescence from the cover glass of Embodiment 4 is denoted by $B_{CG}'$ and auto-fluorescence from the cover glass used in Comparative example 4 is denoted by $B_{CG}$, the auto-fluorescence ratio satisfies Condition (1c-1) (namely, $B_{CG}'/B_{CG} \leq 0.7$).

When the cover glass of Embodiment 4 is used instead of the cover glass of Comparative example 4 and the same specimen as in Comparative example 4 is observed under the same condition, the background light by the auto-fluorescence is reduced and it becomes possible to observe the single molecule.

COMPARATIVE EXAMPLE 5

The same fluorescence microscope apparatuses as in Comparative example 4 are used to perform the observation of the specimen satisfying Condition (2-2) (that is, $(S-s)/(B+b) \leq 3$) and Condition (3c-2) (that is, $3B_{CG}/B \geq 0.4$). The totally reflecting fluorescence observation by the totally reflecting fluorescence observation apparatus shown in FIG. 3B as well as the ordinary fluorescence observation is carried out. In addition, the FRET, the calcium ratio imaging, and the moving-picture observation are performed. In the observation image in this case, the entire image, as shown in FIG. 4B, is light and whitish in color and it is very difficult to observe a fine structure of the observation object.

Embodiment 5

In each of the fluorescence microscope apparatuses used in Comparative example 5, observation is made by changing only the cover glass as described blow. In the cover glass of Embodiment 5, the refractive index and the Abbe's number are equivalent to those of the cover glass of Comparative example 5. When auto-fluorescence from the cover glass of Embodiment 5 is denoted by $B_{CG}'$ and auto-fluorescence from the cover glass used in Comparative example 5 is denoted by $B_{CG}$, the auto-fluorescence ratio satisfies Condition (1c-2) (namely, $B_{CG}'/B_{CG} \leq 0.5$).

When the cover glass of Embodiment 5 is used instead of the cover glass of Comparative example 5 and the same specimen as in Comparative example 5 is observed under the same condition, it can be confirmed that the fine structure of the observation object, as shown in FIG. 4A, can be sharply observed, the background light by the auto-fluorescence is reduced, and the S/N ratio of the observation image is improved.

COMPARATIVE EXAMPLE 6

The same fluorescence microscope apparatuses as in Comparative example 4 are used to perform the observation of the specimen satisfying Condition (2-1) (that is, $(S-s)/(B+b) \leq 5$) and Condition (3c-1) (that is, $3B_{CG}/B \geq 0.2$). The totally reflecting fluorescence observation by the totally reflecting fluorescence observation apparatus shown in FIG. 3B as well as the ordinary fluorescence observation is carried out. In addition, the FRET, the calcium ratio imaging, and the moving-picture observation are performed.

Embodiment 6

In each of the fluorescence microscope apparatuses used in Comparative example 6, observation is made by changing only the cover glass as described blow. In the cover glass of Embodiment 6, the refractive index and the Abbe's number are equivalent to those of the cover glass of Comparative example 6. When auto-fluorescence from the cover glass of Embodiment 6 is denoted by $B_{CG}'$ and auto-fluorescence from the cover glass used in Comparative example 6 is denoted by $B_{CG}$, the auto-fluorescence ratio satisfies Condition (1c-3) (namely, $B_{CG}'/B_{CG} \leq 0.3$).

When the cover glass of Embodiment 6 is used instead of the cover glass of Comparative example 6 and the same specimen as in Comparative example 6 is observed under the same condition, it can be confirmed that the background light by the auto-fluorescence is reduced, and the S/N ratio of the observation image is improved.

COMPARATIVE EXAMPLE 7

In each of the conventional microscope apparatuses used in Comparative example 4, in order to observe feebler fluorescent light by increasing the NA of the observation optical system, the objective lens is changed to Model APO1OOXOHR (NA 1.65) made by OLYMPUS CORP., the immersion substance is changed to a substance of refractive index 1.78 made by Cargile & Co., Ltd., and the cover glass is changed to a cover glass ground from Glass S-LAH66 (index 1.77) made by OHARA INC. to thereby carry out the observation of the specimen satisfying Condition (2-3) (namely, $(S-s)/(B+b) \leq 2$). The totally reflecting fluorescence observation by the totally reflecting fluorescence observation apparatus shown in FIG. 3B as well as the ordinary fluorescence observation is carried out. In addition, the FRET and the moving-picture observation are performed.

Embodiment 7

In each of the fluorescence microscope apparatuses used in Comparative example 7, observation is made by changing only the cover glass as described blow. In the cover is glass of Embodiment 7, the refractive index and the Abbe's number are equivalent to those of the cover glass of Comparative example 7. When auto-fluorescence from the cover glass of Embodiment 7 is denoted by $B_{CG}'$ and auto-fluorescence from the cover glass used in Comparative example 7 is denoted by $B_{CG}$, the auto-fluorescence ratio satisfies Condition (1c-1) (namely, $B_{CG}'/B_{CG} \leq 0.7$).

When the cover glass of Embodiment 7 is used instead of the cover glass of Comparative example 7 and the same specimen as in Comparative example 7 is observed under the same condition, it can be confirmed that the background light by the auto-fluorescence is reduced, and the S/N ratio of the observation image is improved.

COMPARATIVE EXAMPLE 8

Observations are first made by using the conventional fluorescence microscope apparatuses shown in FIGS. 1 and 2. The single-molecule fluorescence observation with ordinary reflecting fluorescence is carried out by using Model UPLSAPO60XO made by OLYMPUS CORP. as the objective lens; MATSUNAMI MICRO COVER GLASS No. 1-S by MATSUNAMI GLASS IND., LTD. as the cover glass; the immersion oil (the refractive index nd=1.52) by OLYMPUS CORP. as the immersion substance; Model IX71 by OLYMPUS CORP. as the inverted microscope; and Model EM-CCD by Hamamatsu Photonics K. K. as the detector. The totally reflecting fluorescence observation by the totally reflecting fluorescence observation apparatus shown in FIG. 3B as well as the ordinary fluorescence observation is carried out. In addition, the FRET and the moving-picture observation are performed. The specimen satisfies Condition (2-3) (that is, $(S-s)/(B+b) \leq 2$) and Condition (3b-3) (that is, $3B_{IM}/B \geq 0.6$). In the fluorescence microscope apparatuses of Comparative example 8, background light produced by auto-fluorescence is intense and the single-molecule observation cannot be made.

Embodiment 8

In each of the fluorescence microscope apparatuses used in Comparative example 8, observation is made by changing only the immersion substance as described blow. In the immersion substance of Embodiment 8, the refractive index and the Abbe's number are equivalent to those of the immersion substance of Comparative example 8. When auto-fluorescence from the immersion substance of Embodiment 8 is denoted by $B_{IM}'$ and auto-fluorescence from the immersion substance used in Comparative example 8 is denoted by $B_{IM}$, the auto-fluorescence ratio satisfies Condition (1b-1) (namely, $B_{IM}'/B_{IM} \leq 0.7$).

When the immersion substance of Embodiment 8 is used instead of the immersion substance of Comparative example 8 and the same specimen as in Comparative example 8 is observed under the same condition, the background light by the auto-fluorescence is reduced and it becomes possible to observe the single molecule.

COMPARATIVE EXAMPLE 9

The same fluorescence microscope apparatuses as in Comparative example 8 are used to perform the observation of the specimen satisfying Condition (2-2) (that is, $(S-s)/(B+b) \leq 3$) and Condition (3b-2) (that is, $3B_{IM}/B \geq 0.4$). The totally reflecting fluorescence observation by the totally reflecting fluorescence observation apparatus shown in FIG. 3B as well as the ordinary fluorescence observation is carried out. In addition, the FRET, the calcium ratio imaging, and the moving-picture observation are performed. In the observation image in this case, the entire image, as shown in FIG. 4B, is light and whitish in color and it is very difficult to observe a fine structure of the observation object.

Embodiment 9

In each of the fluorescence microscope apparatuses used in Comparative example 9, observation is made by changing only the immersion substance as described blow. In the immersion substance of Embodiment 9, the refractive index and the Abbe's number are equivalent to those of the immersion substance of Comparative example 9. When auto-fluorescence from the immersion substance of Embodiment 9 is denoted by $B_{IM}'$ and auto-fluorescence from the immersion substance used in Comparative example 9 is denoted by $B_{IM}$, the auto-fluorescence ratio satisfies Condition (1b-2) (namely, $B_{IM}'/B_{IM} \leq 0.5$).

When the immersion substance of Embodiment 9 is used instead of the immersion substance of Comparative example 9 and the same specimen as in Comparative example 9 is observed under the same condition, it can be confirmed that the fine structure of the observation object, as shown in FIG. 4A, can be sharply observed, the background light by the auto-fluorescence is reduced, and the S/N ratio of the observation image is improved.

COMPARATIVE EXAMPLE 10

The same fluorescence microscope apparatuses as in Comparative example 8 are used to perform the observation of the specimen satisfying Condition (2-1) (that is, $(S-s)/(B+b) \leq 5$) and Condition (3b-1) (that is, $3B_{IM}/B \geq 0.2$). The totally reflecting fluorescence observation by the totally reflecting fluorescence observation apparatus shown in FIG. 3B as well as the ordinary fluorescence observation is carried out. In addition, the FRET, the calcium ratio imaging, and the moving-picture observation are performed.

Embodiment 10

In each of the fluorescence microscope apparatuses used in Comparative example 10, observation is made by changing only the immersion substance as described blow. In the immersion substance of Embodiment 10, the refractive index and the Abbe's number are equivalent to those of the immersion substance of Comparative example 10. When auto-fluorescence from the immersion substance of Embodiment 10 is denoted by $B_{IM}'$ and auto-fluorescence from the immersion substance used in Comparative example 10 is denoted by $B_{IM}$, the auto-fluorescence ratio satisfies Condition (1b-3) (namely, $B_{IM}'/B_{IM} \leq 0.3$).

When the immersion substance of Embodiment 10 is used instead of the immersion substance of Comparative example 10 and the same specimen as in Comparative example 10 is observed under the same condition, it can be confirmed that the background light by the auto-fluorescence is reduced and the S/N ratio of the observation image is improved.

COMPARATIVE EXAMPLE 11

In each of the conventional microscope apparatuses used in Comparative example 8, in order to observe feebler fluorescent light by increasing the NA of the observation optical system, the objective lens is changed to Model APO1OOXOHR (NA 1.65) made by OLYMPUS CORP., the immersion substance is changed to a substance of refractive index 1.78 made by Cargile & Co., Ltd., and the cover glass is changed to a cover glass ground from Glass S-LAH66 (index 1.77) made by OHARA INC. to thereby carry out the observation of the specimen satisfying Condition (2-3) (namely, $(S-s)/(B+b) \leq 2$). The totally reflecting fluorescence observation by the totally reflecting fluorescence observation apparatus shown in FIG. 3B as well as the ordinary fluorescence observation is carried out. In addition, the FRET and the moving-picture observation are performed.

Embodiment 11

In each of the fluorescence microscope apparatuses used in Comparative example 11, observation is made by changing only the immersion substance as described blow. In the immersion substance of Embodiment 11, the refractive index and the Abbe's number are equivalent to those of the immersion substance of Comparative example 11. When auto-fluorescence from the immersion substance of Embodiment 11 is denoted by $B_{IM}'$ and auto-fluorescence from the immersion substance used in Comparative example 11 is denoted by $B_{IM}$, the auto-fluorescence ratio satisfies Condition (1b-1) (namely, $B_{IM}'/B_{IM} \leq 0.7$).

When the immersion substance of Embodiment 11 is used instead of the immersion substance of Comparative example 11 and the same specimen as in Comparative example 11 is observed under the same condition, it can be confirmed that the background light by the auto-fluorescence is reduced and the S/N ratio of the observation image is improved.

By a comparison of the comparative examples with the embodiments, it can be confirmed that when the objective lens, the cover glass, and the immersion substance of the present invention are used, it can be confirmed that the S/N ratio in the fluorescence observation is improved and an observation with higher quality is possible. Also, the present invention is not limited to combinations of the above embodiments. For example, in Embodiment 1, when the objective lens satisfying the condition, $B_{OB}'/B_{OB} \leq 0.3$, is used, the effect of improvement on the S/N ratio becomes higher.

Also, although the embodiments have been described by using the inverted microscopes, the microscopes are not limited to the inverted microscopes, and even when the upright microscopes are used, the same effect can be brought about.

The microscope used in the present invention may be constructed as an upper-and-lower microscope in which the inverted microscope and the upright microscope are arranged, with the specimen between them. In the upper-and-lower microscope, when one of the objective lens, the cover glass, and the immersion substance, shown in each embodiment of the present invention is used on either the upright microscope side or the inverted microscope side, the effect of the present invention can be brought about. The upright microscope side and the inverted microscope side may be designed to drive either independently or in association with each other. In addition, different observation techniques may be used on both sides of the upper-and-lower microscope so that, for example, the ordinary fluorescence observation is made on the upright microscope side and the totally reflecting fluorescence observation is made on the inverted microscope side.

The fluorescence observation or fluorescence measuring system and the fluorescence observation or fluorescence measuring method in the present invention are useful for the fields of microscopes, fluorescence microscopes, and protein and DNA analytical apparatuses in which the importance of the technique that allows accurate observation and measurement of feeble fluorescent light in a broad band is increased and accurate quantification, including the noise, is required.

What is claimed is:

1. A fluorescence observation or measurement system for observing or measuring a specimen that uses a living cell and emits fluorescent light,
   the fluorescence observation or measurement system comprising:
      an objective lens including optical elements made of glass;
      an immersion substance; and
      a cover glass,
      wherein at least one of the following Conditions (1a-1), (1b-1) and (1c-1) is satisfied:

$$B_{OB}'/B_{OB} \leq 0.7 \tag{1a-1}$$

$$B_{IM}'/B_{IM} \leq 0.7 \tag{1b-1}$$

$$B_{CG}'/B_{CG} \leq 0.7 \tag{1c-1}$$

wherein the specimen satisfies at least one of the following Conditions (2-1) and (3-1):

$$(S-s)/(B+b) \leq 5 \tag{2-1}$$

$$(B_{OB}+B_{IM}+B_{CG})/B \geq 0.2 \tag{3-1}$$

where $B_{OB}'$ is an average intensity value of auto-fluorescence from the objective lens, $B_{OB}$ is an average intensity value of auto-fluorescence from a conventional objective lens generally used, $B_{IM}'$ is an average intensity value of auto-fluorescence from the immersion substance, $B_{IM}$ is an average intensity value of auto-fluorescence from a conventional immersion substance generally used, $B_{CG}'$ is an average intensity value of auto-fluorescence from the cover glass, $B_{CG}$ is an average intensity value of auto-fluorescence from a conventional cover glass generally used, S is an average intensity value of fluorescent light emanating from the specimen, s is a fluctuation range of the intensity of the fluorescent light, B is an average intensity value of a background noise from where an object to be observed or measured is absent in the specimen, and b is a fluctuation range of the intensity of the back ground noise.

2. A fluorescence observation or measurement system according to claim 1,
   wherein the fluorescence observation or measurement system is configured so that FRET (fluorescence resonance energy transfer) is selectable as an application for observing or measuring the specimen.

3. A fluorescence observation or measurement system according to claim 2,
   wherein the fluorescence observation or measurement system is constructed as a fluorescence microscope system.

4. A fluorescence observation or measurement system according to claim 2,
wherein the fluorescence observation or measurement system is constructed as a totally reflecting microscope system.

5. A fluorescence observation or measurement system according to claim 2,
wherein the fluorescence observation or measurement system is constructed as a microscope system in which two microscopes are arranged so that their respective objective optical systems are located opposite to each other with the specimen being interposed between, the two microscopes being two fluorescence microscopes, two totally reflecting microscopes, or one fluorescence microscope and one totally reflecting microscope.

6. A fluorescence observation or measurement system according to claim 1,
wherein the fluorescence observation or measurement system is configured so that calcium imaging is selectable as an application for observing or measuring the specimen.

7. A fluorescence observation or measurement system according to claim 6,
wherein the fluorescence observation or measurement system is constructed as a fluorescence microscope system.

8. A fluorescence observation or measurement system according to claim 6,
wherein the fluorescence observation or measurement system is constructed as a totally reflecting microscope system.

9. A fluorescence observation or measurement system according to claim 6,
wherein the fluorescence observation or measurement system is constructed as a microscope system in which two microscopes are arranged so that their respective objective optical systems are located opposite to each other with the specimen being interposed between, the two microscopes being two fluorescence microscopes, two totally reflecting microscopes, or one fluorescence microscope and one totally reflecting microscope.

10. A fluorescence observation or measurement system according to claim 1,
wherein the fluorescence observation or measurement system is configured so that a moving-picture observation or time-lapse observation is selectable as an application for observing or measuring the specimen.

11. A fluorescence observation or measurement system according to claim 10,
wherein the fluorescence observation or measurement system is constructed as a fluorescence microscope system.

12. A fluorescence observation or measurement system according to claim 10,
wherein the fluorescence observation or measurement system is constructed as a totally reflecting microscope system.

13. A fluorescence observation or measurement system according to claim 10,
wherein the fluorescence observation or measurement system is constructed as a microscope system in which two microscopes are arranged so that their respective objective optical systems are located opposite to each other with the specimen being interposed between, the two microscopes being two fluorescence microscopes, two totally reflecting microscopes, or one fluorescence microscope and one totally reflecting microscope.

* * * * *